(12) United States Patent
Boulia et al.

(10) Patent No.: US 6,275,866 B1
(45) Date of Patent: Aug. 14, 2001

(54) MANIPULATION AND COUPLING OF OBJECT ORIENTED COMPONENTS

(75) Inventors: Donald J. Boulia, Framingham, MA (US); David G. Greenwood, Lafayette, CO (US)

(73) Assignee: MathSoft Engineering & Education, Inc., Cambridge, MA (US)

( * ) Notice: Subject to any disclaimer, the term of this patent is extended or adjusted under 35 U.S.C. 154(b) by 0 days.

(21) Appl. No.: 09/034,185

(22) Filed: Mar. 3, 1998

Related U.S. Application Data
(60) Provisional application No. 60/039,071, filed on Mar. 14, 1997.

(51) Int. Cl.[7] .................................................. G06F 9/54
(52) U.S. Cl. ............................................................ 709/315
(58) Field of Search .................................. 709/303, 301, 709/302, 200, 310–332, 230–244

(56) References Cited

U.S. PATENT DOCUMENTS

| | | | |
|---|---|---|---|
| 5,659,676 | * 8/1997 | Redpath et al. | 395/777 |
| 5,719,942 | * 2/1998 | Aldred et al. | 380/49 |
| 5,768,587 | * 6/1998 | Freund et al. | 709/101 |
| 5,805,885 | * 9/1998 | Leach et al. | 709/303 |
| 5,983,274 | * 11/1999 | Hyder et al. | 709/230 |
| 6,003,037 | * 12/1999 | Kassabgi et al. | 707/103 |
| 6,029,207 | * 2/2000 | Heninger | 709/305 |

OTHER PUBLICATIONS

Martin Heller "Future documents", May 1991.*
Addison–Wesley "OpenDoc Programmer's Guide", Dec. 1995.*
Yellin et al. "Interfaces, Protocols, and the Semi–Automatic Construction of Software Adaptors" ACM pp 176–190, 1994.*
Chang et al. "A Petri–net based Specification Method for Architectural Components" IEEE pp 396–402, 1999.*
Malm et al. "The Core Support Module: Open Architecture Basis for Sido Command Centers" IEEE pp 0717–0725, 1992.*

* cited by examiner

*Primary Examiner*—St. John Courtenay, III
(74) *Attorney, Agent, or Firm*—Weingarten, Schurgin, Gagnebin & Hayes LLP

(57) ABSTRACT

Software components such as objects, applications and computational blocks are linked through a data flow manager and an interface that facilitate data exchange between the components. The interface defines a communication protocol. Components that comply with the protocol can share data, even if such components are associated with unrelated applications. Non-compliant components can be paired with translation objects or controlled by scripts to allow such non-compliant components to be linked to compliant components for data sharing. The data flow manager controls data exchange by determining which components are prepared to share data, and then prompting only prepared components to share data. Data exchange is executed in discrete steps.

8 Claims, 5 Drawing Sheets

Data :=

| | | |
|---|---|---|
| 0.34 | 0.00 | 0.94 |
| 0.11 | 0.33 | 0.94 |
| -0.28 | 0.20 | 0.94 |
| -0.28 | -0.20 | 0.94 |
| 0.11 | -0.33 | 0.94 |

60

Adjacency :=

| | |
|---|---|
| 2 | 1 |
| 5 | 1 |
| 6 | 1 |
| 1 | 2 |
| 3 | 2 |

62

Angles of rotation: $\phi := \frac{\pi}{2}$  $\theta := \frac{\pi}{4}$ $$R := \begin{bmatrix} \cos(\theta \cdot \deg) & -\sin(\theta \cdot \deg) & 0 \\ \sin(\theta \cdot \deg) \cdot \cos(\phi \cdot \deg) & \cos(\theta \cdot \deg) \cdot \cos(\phi \cdot \deg) & -\sin(\phi \cdot \deg) \\ \sin(\theta \cdot \deg) \cdot \sin(\phi \cdot \deg) & \cos(\theta \cdot \deg) \cdot \sin(\phi \cdot \deg) & \cos(\phi \cdot \deg) \end{bmatrix}$$

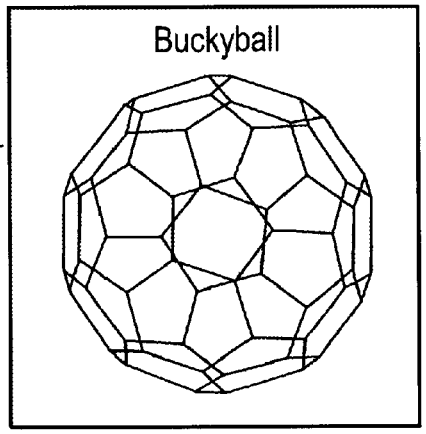

Buckyball

66

( Adjacency Data • R )

*FIG. 6*

MANIPULATION AND COUPLING OF OBJECT ORIENTED COMPONENTS

CROSS REFERENCE TO RELATED APPLICATIONS

A claim of priority is made to U.S. Provisional Patent Application Ser. No. 60/039,071 entitled EXTENSIBLE ENVIRONMENT FOR MANIPULATION AND COUPLING OF COMPUTATIONAL BLOCKS, filed Mar. 14, 1997.

BACKGROUND OF THE INVENTION

The present invention is generally related to object oriented computing, and more particularly to interaction between components in an object oriented computing environment.

As computer technology has matured, a variety of "standard" software applications have been developed to suit specific needs and accomplish specific types of tasks. For example, word processing applications have been developed for generating written documents, spreadsheets have been developed for making arithmetical computations, and databases have been developed for organizing, storing and retrieving information. While these and other standard software applications facilitate the respective tasks for which they were designed, other tasks present requirements which draw upon the capabilities of a plurality of such software applications.

In response to the need for software applications which would benefit from the capabilities of a plurality of standard applications, such as a database and word processor, it is known to develop customized software applications. However, development of such customized software applications is costly and time consuming, and may still fall short of desired objectives in the event further capabilities are needed which are not incorporated. One alternative to developing customized software applications is to export data from various software applications having appropriate features for given sub-tasks into one common application to create a presentation document. For example, arithmetical calculations could be made in a spreadsheet application, data could be sorted in a database application, and the results from both applications exported into a word processing application for inclusion in a word processing document for presentation. However, this solution has drawbacks. Exporting data typically requires tedious data transfer operations to be manually performed by the user. Further, when data is updated in one of the applications, such updates are not automatically provided to the presentation application. Consequently, substantial effort is required to assure that the presentation document is kept up to date.

Another solution to the above-mentioned problems is to embed objects via the Object Linking and Embedding ("OLE") standard. In order to comply with the OLE standard, objects and containers must implement predefined interfaces. Through such interfaces OLE allows data associated with a first application to appear in a document associated with a second application. However, such data is merely displayed in the document and cannot be employed for computation or similar tasks.

BRIEF SUMMARY OF THE INVENTION

In accordance with the present invention, software components such as objects, containers, applications and computational blocks implement an interface which facilitates performance of computational tasks on shared data. The interface defines a communication protocol for data sharing. Components that comply with the protocol can share data even if such components are associated with unrelated applications. A data flow manager controls data exchange by determining which components are prepared to share data, and prompting prepared components to share data in discrete steps. Following exchange, the shared data can be employed for computational and similar tasks.

Non-compliant objects can be coupled with supporting objects to allow participation in data sharing activities. In particular, a translation object that implements the interface can be associated with a non-compliant object that does not implement the interface to produce a translation component that retains the functional attributes of the non-compliant object but implements the interface required for data sharing. Similarly, a non-compliant object can be associated with a script and a script interface object to produce a scripted component that retains the functional attributes of the non-compliant object but implements the interface required for data sharing.

The present invention may be advantageously employed to link a plurality of objects associated with a plurality of different respective applications and thereby exploit desired features from such applications. For example, a database application and a word processing application may be linked to a spreadsheet application such that data from the database is automatically supplied to the spreadsheet, where arithmetic computations are performed on the data and embedded text from the word processing application describes the computations. By linking applications in this manner, it is possible to take advantage of the divergent capabilities of a plurality of applications and combine such capabilities into a single "document" without the effort associated with the development of customized applications.

BRIEF DESCRIPTION OF THE DRAWING

The invention will be more fully understood from the following Detailed Description of the Invention in conjunction with the Drawing, of which:

FIG. 6 illustrates an implementation of the environment to model a 60-carbon molecule known as an alkene buckminsterfullerene.

DETAILED DESCRIPTION OF THE INVENTION

Figure 1:
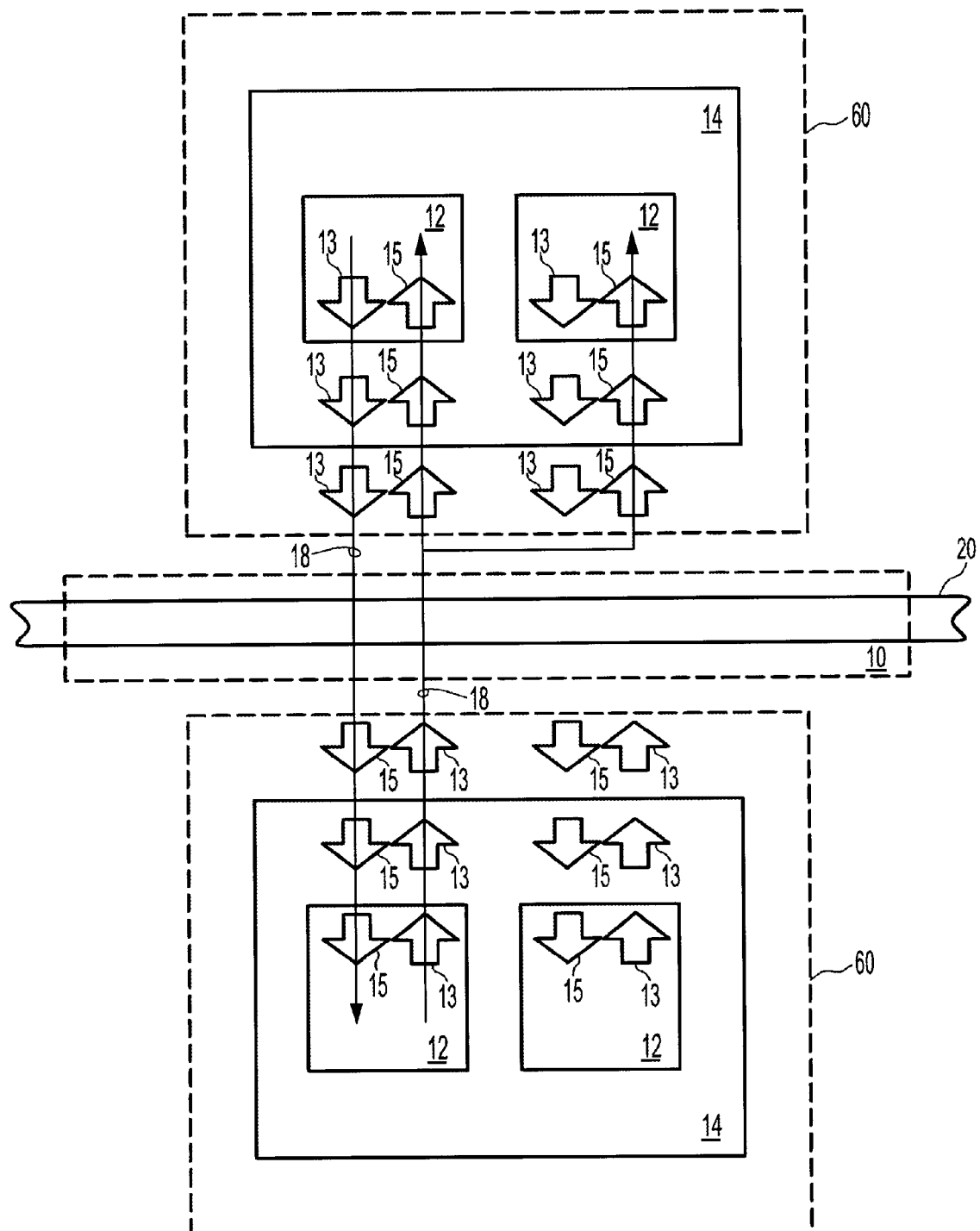
FIG. 1 is a block diagram of the extensible environment, including the interface and data flow manager.

FIG. 1 illustrates an extensible environment including a data flow manager 10 for manipulation and coupling of components such as objects 12, applications 14 and computational blocks. Object oriented software applications 14 run in the environment. Each application 14 includes a plurality of objects 12 which execute tasks and control the data associated with the applications. Components within an application interact directly by means known in the art. Components in different applications interact along data flow channels 18 formed through an interface 20. In particular, a transmission protocol is defined by the interface 20, and objects and other components that comply with the transmission protocol can interact directly through the interface via the data flow channels 18.

The environment is preferably an Object Linking and Embedding ("OLE") container or other similar container that allows direct "embedding" of OLE objects, and the embedded objects are preferably OLE objects. An application that implements the OLE container interface is able to "host" other OLE objects that implement the OLE server interface. This OLE technology provides flexibility to insert other types of components into the document even though the components were created by other products written by other software manufacturers.

The data flow manager 10 coordinates data movement along the channels 18 during execution. A management Application Programming Interface ("API") is employed to implement the data flow manager 10. Within every component 12, output interfaces are associated with output queues 13 and input interfaces are associated with input queues 15. The data flow manager 10 coordinates transfer of data from output queue to input queue, and is responsible for replicating data when multiple components are connected to an output. A high level set of API functions is provided at the component level to allow components to query, send and retrieve data from the data flow manager 10. The data flow manager also flushes input queues 15 and output queues 13 when execution is halted.

Figure 2:
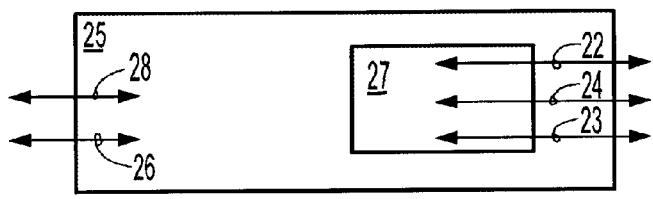
FIG. 2 is a block diagram of a compliant component.

Referring to FIG. 2, the interface 20 (FIG. 1) includes a core set of independent interfaces including an Object Exec interface 22, an Object interface 24, a Container Exec interface 26 and a Container interface 28. A container 25 functions to contain at least one object 27 that is embedded in an application. The Object interface 24, Object Exec interface 22, Container interface 28 and Container Exec interface 26 provide a model in which Starting, Stopping and Executing in discreet steps is accommodated, as will be further described. In particular, the Object interface 24 holds basic status information and facilitates defining input and output channels 18 between components through which data is passed, such as by allowing components to connect to one another so as to create a data flow path between the respective components. The Object interface 24 has methods for setting and retrieving basic object pointers such as container sites, translation objects and description files. The Object Exec interface 22 facilitates stepping by defining Start and Stop actions, and how a "ready to step?" query is presented and answered. The Container interface 28 and Container Exec interface 26 facilitate similar respective functions, but for containers rather than objects.

Figure 3:
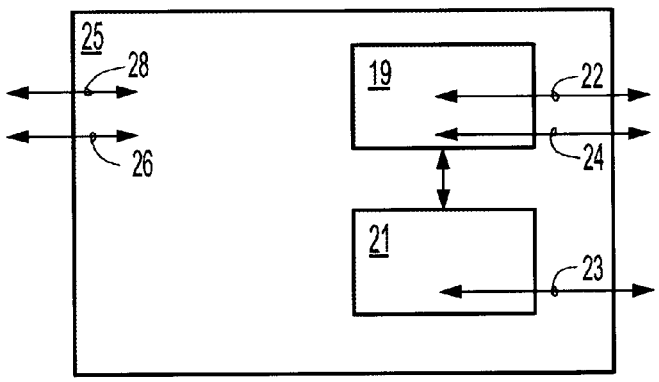
FIG. 3 is a block diagram of a translation component.
Figure 4:
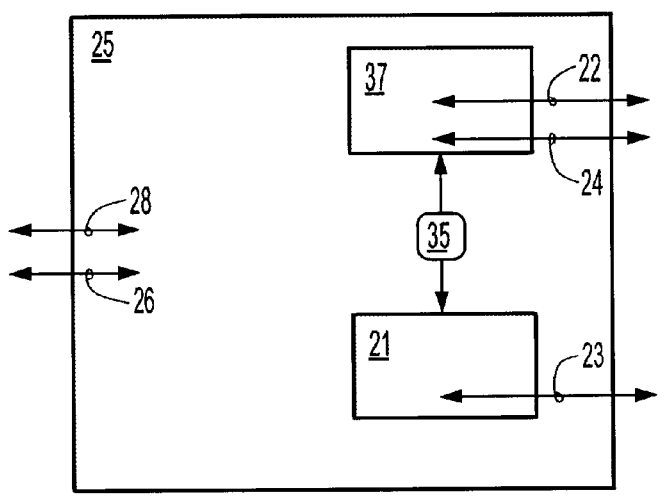
FIG. 4 is a block diagram of a scripted component.

Referring to FIGS. 2, 3 and 4, both compliant components and non-compliant components are supported in the environment. Compliant components 29 are components which implement the interfaces defined for manipulation and coupling, i.e., the Object Exec interface 22 and the Object interface 24 in the case of an object and the Container Exec interface 26 and the Container interface 28 in the case of a container. Non-compliant components, which include translation components 31 and scripted components 33, are symbiotic associations of objects that do not implement the interfaces defined for manipulation and coupling and objects that do implement the interfaces.

Referring to FIG. 2, an exemplary Compliant Component 29 is formed by placing a compliant object, i.e., an object that supports the Object interface 24 and Object Exec interface 22, in a container 25 that supports the Container interface 28 and the Container Exec interface 26. The compliant object 27 is preferably a fully functional OLE object having an OLE Object interface 23. Visual/editing aspects of the compliant object 29 are then handled by the OLE Object interface 23, and actions specific to the environment are handled by the Object interface 24, Object Exec interface 22, Container interface 28 and Container Exec interface 26.

Referring to FIG. 3, an exemplary translation component 31 is formed by combining a non-compliant object 21, such as an OLE object, with a translation object ("Wrapper") 19 in a container 25. The OLE object 21 includes an OLE Object interface 23. The translation object 19 includes an Object interface 24 and an Object Exec interface 22. Visual aspects are handled by the OLE object 21, and actions specific to the environment are handled by the Object interface 24 and Object Exec interface 22 of the translation object 19, and the Container interface 28 and Container Exec interface 26 of the container 25. In particular, the OLE object 21 handles the visual display, including sizing, drawing and in-place activation, while the wrapper 19 provides the interfaces 22, 24 to facilitate data sharing between the OLE object 21 and other components within the environment.

Referring to FIG. 4, an exemplary Scripted Component 33 is formed by combining a script 35, a script interface object 37 and a non-compliant object 21 in a container 25. The non-compliant object 21 is preferably an OLE object with an OLE Object interface 23. The script interface object 37 includes an Object interface 24 and an Object Exec interface 22. A high level language such as an interpretive language is employed in the user-defined script 35 to control objects or automate tasks. In the preferred embodiment the scripting language is Visual Basic, although any suitable scripting language may be employed.

Figure 5:
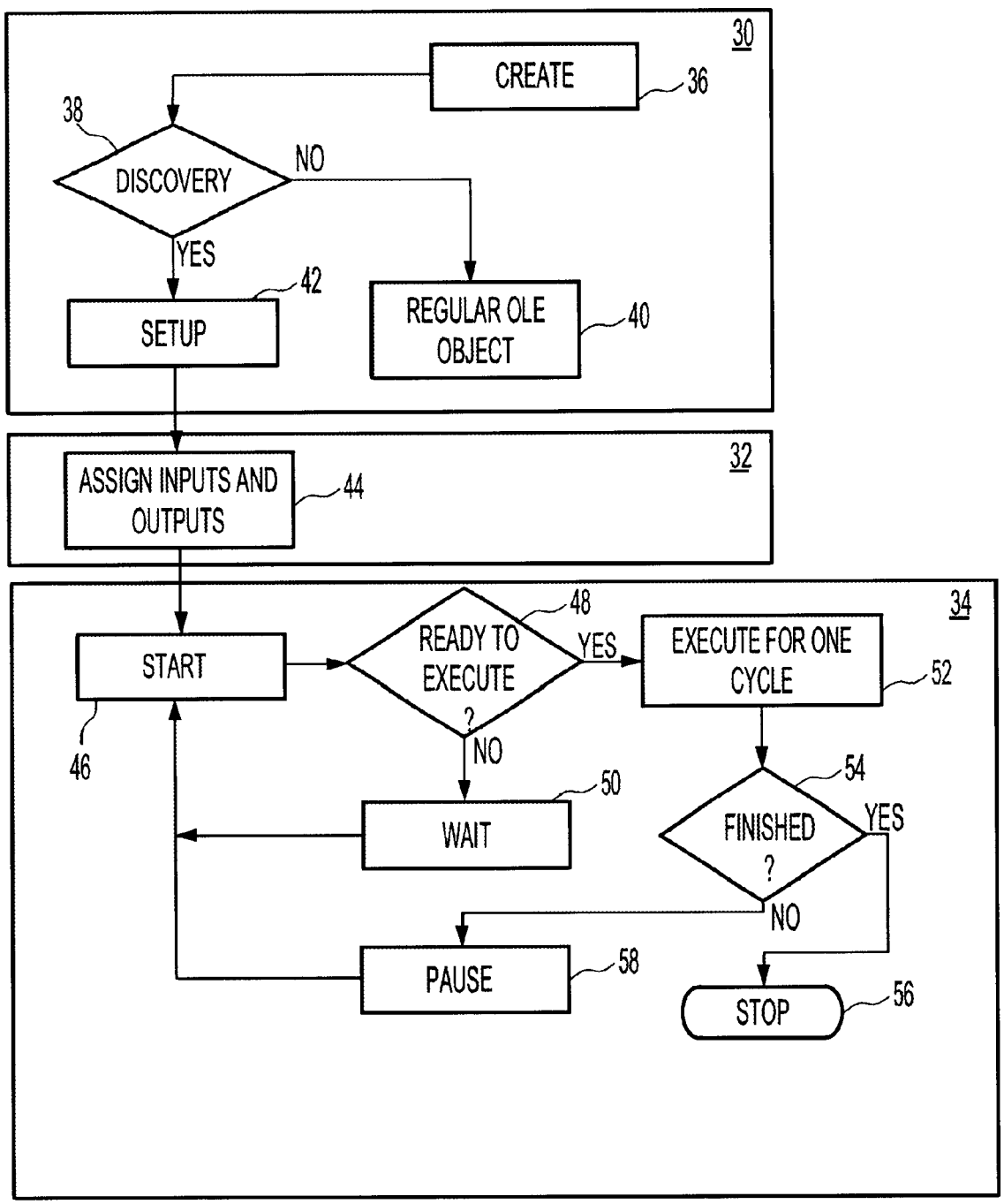
FIG. 5 is a flow diagram that illustrates component creation and operation.

FIG. 5 is a flow diagram which illustrates operation of an object component in the extensible environment of FIG. 1. Object operation is segregated into three phases including a creation phase 30, an assignment phase 32 and an execution phase 34.

During the creation phase 30, the object is created as indicated in step 36. Such creation can be accomplished with standard software development tools. Next, the number of input and output interfaces which will be supported by the object is determined as shown in a discovery step 38. Objects define the number of required connections and the number of output connections that will be provided. This information is employed to display appropriate connection points for interconnection to other objects by the user. Objects without input and output interfaces, such as text objects, are supported but do not participate in computations and are treated as regular Object Linking and Embedding ("OLE") objects as shown in step 40. Objects which support input and/or output interfaces are setup by preparing the identified inputs and outputs as indicated in step 42 to prepare for the assignment phase.

During the assignment phase 32, the input and output interfaces of the object are assigned as indicated in step 44. Assigning interfaces includes associating inputs and outputs with respective output and input interfaces of other objects. One-to-many and many-to-one interface assignment relations may be supported in a preferred embodiment.

Formal operation of the object begins in the execution phase 34 as indicated in step 46. Each object is queried by the data flow manager as indicated in step 48 to determine whether each individual object is prepared to execute for a single discrete cycle by receiving or providing data or commands, depending on how the object was assigned. In response to the query each object operates to determine whether it is prepared to execute for a single cycle. The outcome of such determination could be dependent, for example, upon the presence of necessary input data. For each individual object, if the object is not prepared to execute for a single cycle then that object does not execute at the next cycle as indicated in step 50. However, if the individual object is prepared to execute for a single cycle then that object is prompted to execute at the next cycle as indicated in step 52. If the object has completed execution, as determined in step 54, execution is stopped, as indicated in step 56. If the object has not completed execution, execution is then paused as indicated in step 58 and flow resynchronizes and returns to step 46. When execution eventually completes, operation stops as indicated in step 56. Hence, when operating in accordance with the illustrated flow diagram objects automatically execute and pass data on a step-by-step basis.

FIG. 6 illustrates an implementation of the environment to model a 60-carbon molecule known as an alkene buckminsterfullerene, or "Buckyball." Raw data is provided by "Excel (™)" (OLE) components. The (x,y,z) coordinates of the vertices of the Buckyball are provided by a first "Excel (™)" spreadsheet component 60. An adjacency (connectivity) list is provided by a second Excel (™) spreadsheet component 62. The adjacency list enumerates pairs of nodes (atoms) which are connected by lines (bonds) Rotational calculations are performed in a host application such as "Mathcad (™)." A matrix R carries out rotation by phi around the z-axis, followed by rotation by theta around the horizontal axis. The rotated coordinate matrix and connection list are then passed to a "MATLAB (™)" component 66 for display.

Figure 7:
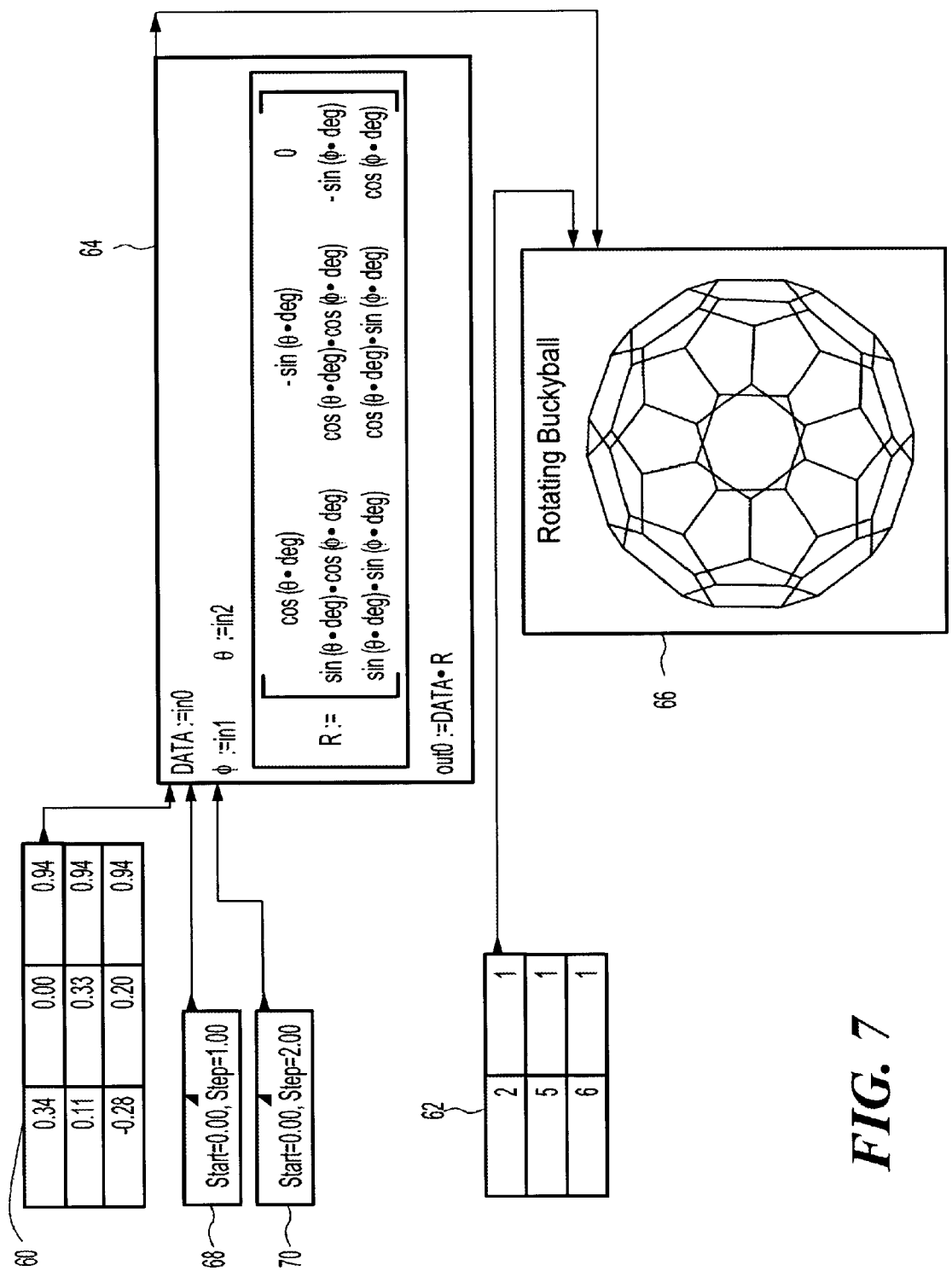
FIG. 7 illustrates an implementation of the environment to animate the model of FIG. 6.

FIG. 7 illustrates an alternative implementation of the environment to produce an animated Buckyball. First and second Excel spreadsheets 60, 62 provide raw data on vertices and connections. First and second ramp components 68, 70 generate successive angles of rotation to produce an animated display. The matrix of vertices and values for the two angles of rotation are sent to the "Mathcad" component 64 which calculates and returns a rotated matrix of vertices. The matrix R carries out rotation by phi around the z-axis, followed by rotation by theta around a horizontal axis. The variables in0, in1 and in2 correspond to the inputs from spreadsheet 60, ramp function 68 and ramp function 70, respectively. The variable out0 represents the single output. This resulting matrix and the list of connections is sent to the "MATLAB" component 66 for display.

Having described the preferred embodiments of the invention, other embodiments which incorporate concepts of the invention will now become apparent to one of skill in the art. Therefore, the invention should not be viewed as limited to the disclosed embodiments but rather should be viewed as limited only by the spirit and scope of the appended claims.

What is claimed is:

1. A method of facilitating transfer of data from a first component to a second component within a plurality of components, comprising the steps of:

forming an interface between the first component and the second component, said interface defining a protocol for data transfer;

forming a channel through the interface beginning at the first component;

determining whether individual ones of said plurality of components are prepared to execute, wherein each one of said plurality of components is associated with a respective application program, wherein said determining includes determining whether data is available for transfer from any one of said plurality of components, wherein said determining further includes determining whether any of said plurality of components are prepared to receive data, and wherein said first component is associated with a non-compliant object within a respective application program that does not implement said protocol for data transfer defined by said interface, and wherein said first component further includes a translation component associated with said non-compliant object to translate data from said non-complaint object into a form compliant with said protocol for data transfer;

prompting, responsive to a determination that the first component is prepared to execute, the first component to execute during a next discrete cycle in order to transfer data through the channel from the first component;

receiving, at the second component, the data transferred through the channel;

determining, following said next discrete cycle, whether said first component is finished executing; and pausing execution of said first component in the event that said first component is determined not to have finished executing following said next discrete cycle.

2. The method of claim 1 wherein the first component includes a non-compliant object that does not implement the protocol defined by the interface, and including the further step of associating a script and a script translating object with the non-compliant object and translating data from the non-compliant object into a protocol compliant form.

3. The method of claim 1 wherein the first component includes an output queue through which data is transmitted through the channel, and including the further step of limiting the output queue to a length that accommodates a single unit of data.

4. The method of claim 1 including the further step of merging a plurality of channels to provide a single output in accordance with an input priority scheme.

5. A software environment for facilitating the transfer of data from a first software component to a second software component, comprising:

an interface disposed between the first and second software components, said interface defining a communication protocol for data transfer;

a data flow management object operable to determine whether individual ones of a plurality of software components are prepared to execute, wherein each one of said plurality of software components is associated with a respective application program, wherein said data flow management object is further operable, as part of said determination of whether individual ones of said plurality of software components are prepared to execute, to determine whether data is available for transfer from any one of said plurality of software components, and wherein said data flow management object is further operable, as part of said determination of whether individual ones of said plurality of software components are prepared to execute, to determine whether any of said plurality of software components are prepared to receive data, wherein said plurality of software components includes the first software component and the second software component, and wherein the first software component is associated with a non-compliant object in a respective application program that does not implement the communication protocol defined by the interface, and wherein said first software component includes a translation component associated with the non-compliant object to translate data from the non-complaint object into a protocol compliant form; and a channel formed through said interface beginning at the first software component, said data flow management object being further operative to prompt, responsive to a determination that the first software component is prepared to execute, the first software component to execute during a next discrete cycle in order to transfer data through said channel from the first software component, and wherein said data flow management object is further operable to determine, following said next discrete cycle, whether said first component is finished executing and to pause execution of said first component in the event that said first component is determined not to have finished executing following said next discrete cycle.

6. The apparatus of claim 5 wherein the first component includes a non-compliant object that does not implement the protocol defined by the interface, a script associated with the non-compliant object, and a script translation component associated with the script to translate data from the non-compliant object into a protocol compliant form.

7. The apparatus of claim 5 wherein the first component includes an output queue for data transmission, said output queue having a length capable of accommodating no more than a single data unit.

8. The apparatus of claim 5 further including a channel merger that combines inputs from a plurality of channels to provide a single output in accordance with an input priority scheme.

* * * * *